US011530023B2

(12) United States Patent
St-Jean et al.

(10) Patent No.: US 11,530,023 B2
(45) Date of Patent: Dec. 20, 2022

(54) AIRCRAFT EMERGENCY DOOR AND METHOD OF OPERATING THE SAME

(71) Applicant: BOMBARDIER INC., Dorval (CA)

(72) Inventors: Frederic St-Jean, Laval (CA); Charles Beauchamp, Mirabel (CA); Mohamed Mitwaly, Montreal (CA)

(73) Assignee: BOMBARDIER INC., Dorval (CA)

( * ) Notice: Subject to any disclaimer, the term of this patent is extended or adjusted under 35 U.S.C. 154(b) by 639 days.

(21) Appl. No.: 16/565,594

(22) Filed: Sep. 10, 2019

(65) Prior Publication Data

US 2020/0140055 A1 May 7, 2020

Related U.S. Application Data

(60) Provisional application No. 62/738,052, filed on Sep. 28, 2018.

(51) Int. Cl.
*B64C 1/14* (2006.01)
*E05D 3/02* (2006.01)

(52) U.S. Cl.
CPC ............ *B64C 1/143* (2013.01); *B64C 1/1461* (2013.01); *E05D 3/02* (2013.01); *E05Y 2900/502* (2013.01); *E05Y 2900/531* (2013.01)

(58) Field of Classification Search
CPC ....... B64C 1/143; B64C 1/1461; B64C 1/423; E05D 3/02; E05Y 2900/502; E05Y 2900/531
See application file for complete search history.

(56) References Cited

U.S. PATENT DOCUMENTS

| 4,785,741 | A | | 11/1988 | Gronow | |
|---|---|---|---|---|---|
| 4,787,577 | A | * | 11/1988 | Whittle | B64C 1/1415 D12/345 |
| 9,611,042 | B1 | * | 4/2017 | Childress | E06B 7/28 |
| 9,868,505 | B2 | * | 1/2018 | Childress | B64C 1/1423 |
| 9,889,919 | B2 | | 2/2018 | Childress et al. | |

FOREIGN PATENT DOCUMENTS

| FR | 2696706 A1 | * | 4/1994 | ........... B64C 1/1407 |
|---|---|---|---|---|
| GB | 526648 | * | 9/1940 | |

OTHER PUBLICATIONS

Machine translation of Poccard (FR Pub No. 2,696,706) Pub dated Apr. 15, 1994 (Year: 1994).*

* cited by examiner

*Primary Examiner* — Rodney A Bonnette
(74) *Attorney, Agent, or Firm* — Norton Rose Fulbright Canada LLP (57) ABSTRACT

There is disclosed an emergency door positionable in an exit opening of an aircraft. The door has door supports mountable to the lower wall and each having a pivot point. A first pivot axis is defined between the pivot points. A block is mountable to the lower wall and is offset from a center of the lower wall. A door body is mountable within the opening to the door supporting structure and pivotally mountable to the door supports. The door body is pivotable about the first pivot axis from an initial position in which the door body is within the opening, until the door body is disengaged from the door supports. A bottom portion of the door body abuts against the block to define a removal pivot point. The door body is pivotable about the removal pivot point to remove the door body from the exit opening.

13 Claims, 5 Drawing Sheets

AIRCRAFT EMERGENCY DOOR AND METHOD OF OPERATING THE SAME

CROSS-REFERENCE TO RELATED APPLICATIONS

This application claims priority to U.S. provisional patent application 62/738,052 and to Canadian patent application 3,019,204, both filed Sep. 28, 2018, the entire contents of each of which are incorporated by reference herein.

TECHNICAL FIELD

The application relates generally to aircrafts and, more particularly, to emergency exit doors for aircrafts.

BACKGROUND

In an aircraft cabin, a space in front of an emergency exit is typically unusable to allow an emergency door to be securely opened. Seats located on either side of the space are subjected to constraints. In some cases, a passenger sitting in one of those seats has less legroom and is not able to pivot the back rest rearward as much as other seats.

SUMMARY

There is disclosed herein an emergency door positionable in an exit opening of an aircraft, the exit opening defined by a door supporting structure having a lower wall, two side walls at opposed ends of the lower wall and extending upwardly therefrom, and an upper wall extending between the side walls at an upper end of the side walls, the emergency door comprising: door supports mountable to the lower wall to be spaced apart therealong between the side walls, each door support having a base portion mountable to the lower wall and extending upwardly from the base portion into the opening to a pivot point, a first pivot axis being defined between the pivot points of the door supports; a block mountable to the lower wall to extend therefrom into the exit opening, the block being offset from a center of the lower wall; and a door body mountable within the exit opening to the door supporting structure, and pivotally mountable to the door supports, the door body having a release to unlock the door body from the door supporting structure to pivot the door body at least into the aircraft about the first pivot axis from an initial position in which the door body is within the exit opening and away from the initial position until the door body is disengaged from the door supports, a bottom portion of the door body abutting against the block to define a removal pivot point, the door body being pivotable about the removal pivot point to remove the door body from the exit opening.

There is also disclosed herein an aircraft, comprising: a fuselage including a door supporting structure defining an exit opening, the door supporting structure having a lower wall, two side walls at opposed ends of the lower wall and extending upwardly therefrom, and an upper wall extending between the side walls at an upper end of the side walls; door supports secured to the lower wall and spaced apart therealong between the side wall, each of the door supports having a base portion secured to the lower walls and extending upwardly from the base portion into the exit opening to a pivot point, a first pivot axis being defined between the pivot points of the door supports; a block secured to the lower wall to extend therefrom into the exit opening, the block being offset from a center of the lower wall; and an emergency door having a door body received within the exit opening to the door supporting structure, and pivotally mounted to the door supports, the door body having a release to unlock the door body from the door supporting structure to pivot the door body at least into the aircraft, the door body being pivotable about the first pivot axis from an initial position in which the door body is within the opening and away from the initial position until the door body is disengaged from the door supports, a bottom portion of the door body abutting against the block to define a removal pivot point, the door body being pivotable about the removal pivot point to remove the door body from the exit opening.

There is also disclosed herein a method of opening an emergency door received within an exit opening defined by a door supporting structure of an aircraft, the method comprising: unlocking the door body from the door supporting structure; pivoting the door body about a first axis defined by door supports pivotably supporting the door body from an initial position in which the door body is within the opening; pulling the door body inwardly into the aircraft to disengage the door body from the door supports; and pulling the door body further inwardly into the aircraft while rotating the door body about an upright axis.

DESCRIPTION OF THE DRAWINGS

Reference is now made to the accompanying figures in which.

DETAILED DESCRIPTION

Figure 1:
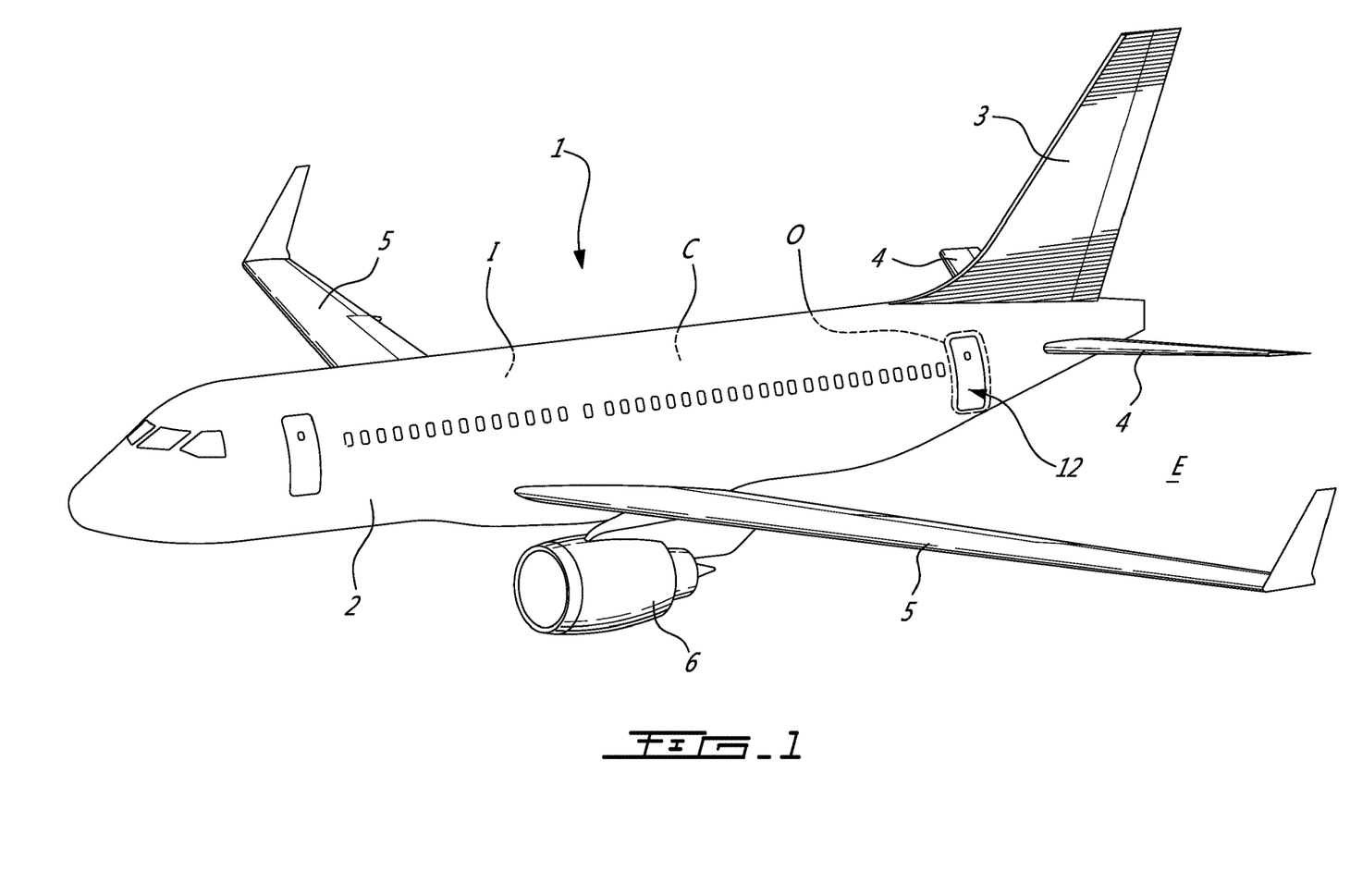
FIG. 1 is a schematic tridimensional view of an aircraft.

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

The aircraft 1 has an emergency door 12 configured for allowing passengers to escape a cabin C (see also FIG. 7) defined by the fuselage 2 of the aircraft 1 in case of an emergency. The emergency door 12 is located within an exit opening O (see also FIG. 5) defined through the fuselage 2. The exit opening O allows communication between an exterior E of the aircraft 1 and an interior I (see also FIG. 2) thereof.

Figure 2:
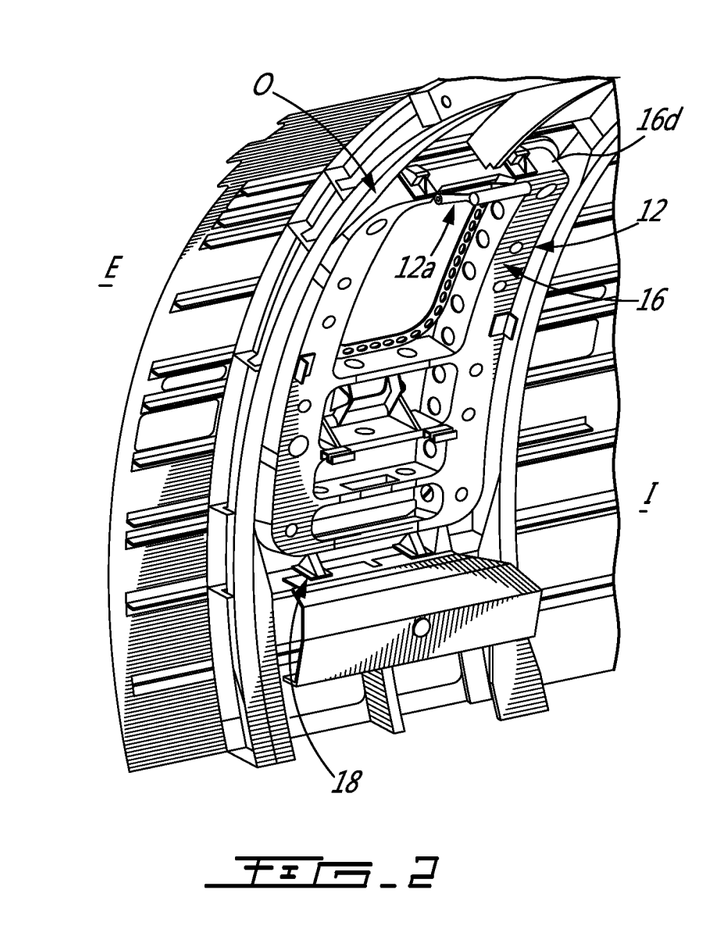
FIG. 2 is a schematic tridimensional view of an emergency door received within an exit opening defined by a fuselage of the aircraft of FIG. 1.
Figure 3:
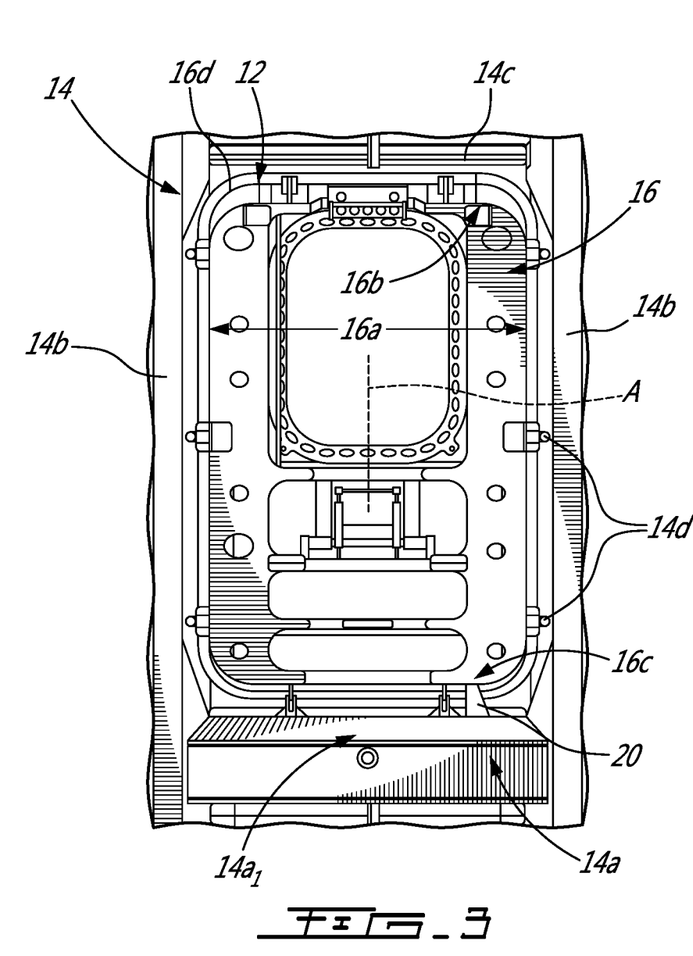
FIG. 3 is a schematic front view of the emergency door of FIG. 2.

Referring now to FIGS. 2-3, the exit opening O (shown covered by the emergency door 12) is defined by a door supporting structure 14. The door supporting structure 14 receives the emergency door 12 and includes a lower wall 14a, two side walls 14b at opposed ends of the lower wall 14a and extending upwardly therefrom, and an upper wall 14c extending between the side walls 14b at an upper end of the side walls 14b. A periphery of the exit opening O is defined by the lower, side, and upper walls 14a, 14b, 14c of the door supporting structure 14. As shown, the lower wall 14a has a center $14a_1$ located at equal distances from each of the side walls 14b.

A door body 16 of the emergency door 12 is received within the exit opening O and is configured to be locked within the exit opening O. The door body 16 is in an initial position when it is received within the exit opening O. The door body 16 has two lateral sides 16a, a top side 16b, and a bottom portion 16c. The bottom portion 16c is a segment or a portion of the door body 16 along its bottom side. When the door body 16 is in the initial position shown in FIGS. 2 and 3, the lateral, top, and bottom sides 16a, 16b, 16c of the door body 16 are respectively aligned with the side, upper, and lower walls 14b, 14c, 14a of the door supporting structure 14. The door body 16 defines a central axis A extending from the bottom portion 16c to the top side 16b, the central axis A being located at equal distance from both of the lateral sides 16a.

The door supporting structure 14 defines a plurality of locking means 14d. In the depicted embodiment, three of the locking means 14d are on each of the lateral sides 16a and side walls 14b. The locking means 14d may be deadbolts secured to the lateral sides 16a of the door body 16 and slidingly receivable within apertures defined through the side walls 14b of the door supporting structure 14. Other configurations are possible.

The emergency door 12 includes a release 12a, which is a handle in the embodiment shown, operatively connected to the locking means 14d. The release 12a may be operable by one of the passengers of the aircraft 1 for releasing the locking means 14d for allowing the door body 16 to be moved out of the emergency exit O.

Figure 4:
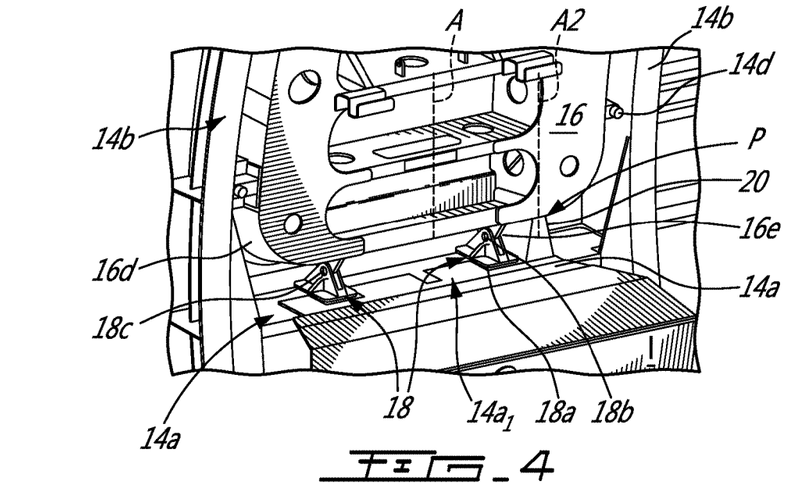
FIG. 4 is an enlarged view of a portion of FIG. 2.
Figure 5:
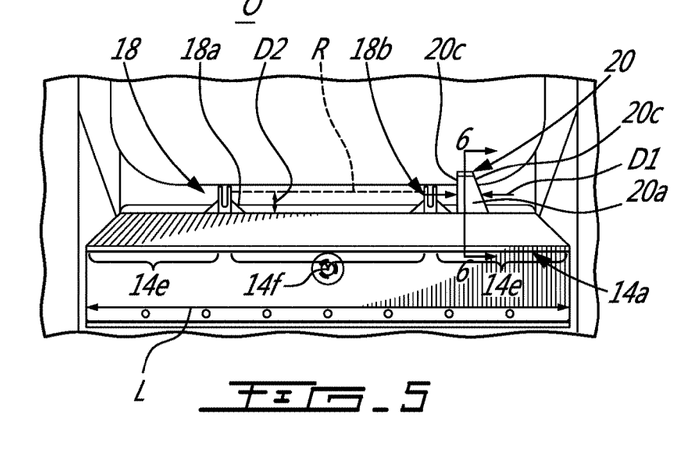
FIG. 5 is a schematic front elevation view of the emergency door of FIG. 2, a door body being removed.

Referring to FIGS. 4 and 5, door supports 18 are secured to the lower wall 14a of the door supporting structure 14. There are two door supports 18 in the depicted embodiment. The door supports 18 extend upwardly from the lower wall 14a toward the exit opening O. As shown, the door supports 18 are spaced apart along a length L of the lower wall 14a. Each of the door supports 18 has a base portion 18a secured to the lower wall 14a and extends upwardly from the base portion 18a into the exit opening O to a pivot point 18b. The door body 16 is supported by the door supports 18, which allow the door body 16 to pivot about a first pivot axis R. The first pivot axis R is defined between the pivot points 18b of the door supports 18 and extends from one of the door support pivot points 18b to the other. In the depicted embodiment, the first pivot axis R is parallel to the lower wall 14a. The door supports 18 partition the lower wall 14a into different segments or portions which collectively make up the length L of the lower wall 14a. The door supports 18 divide the lower wall 14a into side portions 14e extending between each door support 18 and a nearest one of the side walls 14b, and a central portion 14f extending from one of the door supports 18 to the other.

In the illustrated embodiment, the door body 16 has a peripheral flange 16d (see also FIG. 2). The peripheral flange 16d defines an external surface facing away from the interior I of the aircraft 1, and thus toward the exterior E of the aircraft 1. When the door body 16 is received within the exit opening O, the external surface of the peripheral flange 16d abuts against corresponding structures on the side, upper, and/or lower walls 14a, 14b, 14c of the door supporting structure 14. This abutting relationship helps to stop the door body 16 from rotating outwardly toward the exterior E of the aircraft 1. In an alternate embodiment, the peripheral flange 16d is absent such that the door body 16 is pivotable toward the exterior E of the aircraft 10.

In the depicted embodiment, each of the pivot points 18b of the door supports 18 is defined by an engagement of a slot 16e with a pin 18c. As shown, the slots 16e are on the door body 16 and the pins 18c are on the door supports 18. However, it is understood that the slots 16e may be on the door supports 18 and the pins 18c on the door body 16.

Still referring to FIGS. 4 and 5, a block 20 is secured to the lower wall 14a of the door supporting structure 14. The block 20 extends from the lower wall 14a into the exit opening O. The block 20 is offset from the center $14a_1$ of the lower wall 14a. Herein, offset means that the block 20 is not aligned with, or centered on, the center $14a_1$ of the lower wall 14. The block 20 is positioned on the lower wall 14 at a position that is spaced apart from the center $14a_1$ of the lower wall 14. The block 20 is offset from the door body central axis A. In the embodiment shown, the block 20 is located at one of the side portions 14e of the door supporting structure lower wall 14a. Therefore, the central portion 14f of the lower wall 14 is free of the block 20. In a particular embodiment, having the block 20 being offset helps a user to rotate the door body 16 about an upright pivot axis A2. The block 20 is preferably rigid such as to not deflect or deform under a weight of the door body 16. However, it is understood that a certain degree of deflection may be allowed. In the depicted embodiment, the door body 16 is in contact with the block 20 when the door body 16 is in the initial position. Having the block 20 in contact with the door body 16 in the initial position might allow the block 20 to induce rotation of the door body 16 as soon as the door body 16 is moved away from the initial position.

The door body 16 is pivotable about the first pivot axis R defined by the pivot points 18b from the initial position in which the door body 16 is within the exit opening O, as shown in FIG. 4, to an intermediate position in which the bottom portion 16c of the door body 16 abuts against the block 20. In the intermediate position, the door body 16 is disengaged from one or more of the door supports 18 but remains at least partially within the exit opening O. The intermediate position of the door body 16 is therefore a position of the door body 16 in which it is no longer locked to the door support structure 14, and also not entirely out of the exit opening O. In the intermediate position, the door body 16 forms a removal pivot point P at a contact point between the bottom portion 16c of the door body 16 and the block 20. The removal pivot point P is positioned along the side portion 14e of the lower wall 14, and more particularly, closer to the aft-most side wall 14b than to the forward-most side wall 14b. The removal pivot point P lies on the pivot axis A2 that is initially oriented substantially upright. The axis A2 is closer to one of the lateral sides 16a of the door body 16 than the other. In other words, the axis A2 is offset relative to the door body central axis A.

The door body 16 is pivotable about the removal pivot point P. More specifically, the axis A2 of the door body 16 intersects the block 20 at the removal pivot point P. A user is then able to either rotate the door body 16 about the axis A2 and/or change an orientation of the axis A2 relative to the block 20. The axis A2 will be displaced with the door body 16 as the door body 16 is moved from the exit opening O. Having the door body 16 movable while still in contact with the block 20 at the removable pivot point P allows moving the door body 16 from the intermediate position to a final position in which the door body 16 is disengaged from the remaining door supports 18. In a particular embodiment, from the intermediate position to the final position, the door body 16 is in contact with the aircraft 10 solely via the block 20 at the removal pivot point P. In a particular embodiment, this allows easy manoeuvring of the door body 16 from the intermediate to the final positions. In this final position, the door body 16 may be removed from the exit opening O. In the embodiment shown in FIG. 4, the door body 16 pivots about the removal pivot point P and the pivot axis A2 from the intermediate position to the final position toward a rear of the exit opening O (i.e. toward the aft or rear of the cabin C).

Figure 6:
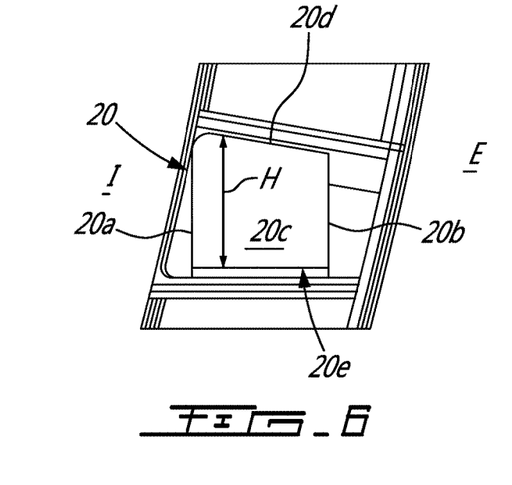
FIG. 6 is a cross-sectional view of a block for the emergency door of FIG. 2, taken along line 6-6 on FIG. 5.

Referring to FIGS. 5 and 6, the block 20 has an inner wall 20a facing toward the interior I of the aircraft 1, an outer wall 20b facing toward the exterior E of the aircraft 1, and two side walls 20c each extending from the inner wall 20a to the outer wall 20b. In the depicted embodiment, a distance D1 (FIG. 5) between the two side walls 20c decreases from the lower wall 14a of the door supporting structure 14a to a top wall 20d of the block 20 such that the block 20 tapers from a base 20e of the block 20 to the top wall 20d. The tapered configuration of the block 20 provides a wider or larger base 20e to support the loads imposed by the door body 16 on the block 20, while having a narrower top wall 20d to accommodate the space constraints in that area of the emergency door 12. A height H of the block 20 defined from the lower wall 14a of the door supporting structure 14 to the top wall 20d of the block 20 is greater at the inner wall 20a than at the outer wall 20b. In the depicted embodiment, the height H decreases linearly from the inner wall 20a to the outer wall 20b. As shown, the top wall 20d is non-parallel to the lower wall 14a of the door supporting structure 14. In the depicted embodiment, the height H of the block is greater than a distance D2 (FIG. 5) taken vertically from the lower wall 14a of the door supporting structure 14 to the pivot points 18b. In a particular embodiment, having the height H greater than the distance D2 helps in the rotation of the door body 16.

Figure 7:
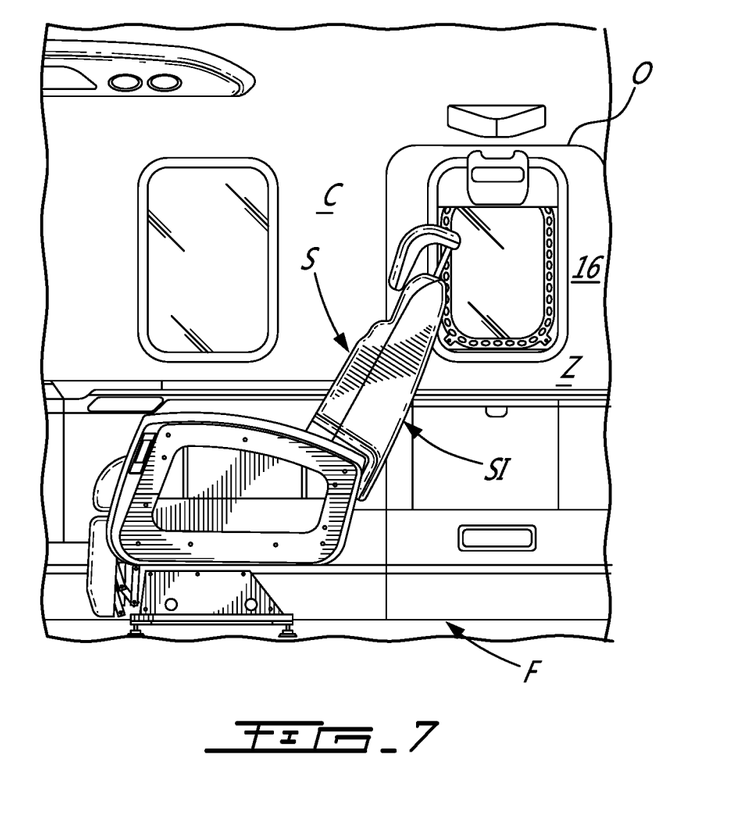
FIG. 7 is a side elevation view of a seat located within a cabin of the aircraft of FIG. 1.

Referring now to FIG. 7, the cabin C includes one or more seats S secured to a floor F of the aircraft 1 for receiving passengers within the cabin C. Usually, an emergency exit zone Z of the cabin C that projects from the exit opening O in a span-wise direction across the cabin 1 is kept free to allow passengers to exit the cabin C in the event of an emergency, and to provide sufficient space to remove the door body 16 and throw it aside. The seats S are arranged in front and aft of the emergency exit zone Z. Typically, the seats S that are located forward of the emergency exit zone Z have a pitch that is less than that of other seats. The pitch is the distance between two consecutive rows of seats, and is commonly referred to as "leg room". Moreover, a back rest S1 of the seat S located forward of the emergency exit zone Z is not able to recline reward as much as that of other seats S in order to prevent the back rest S1 from obstructing the emergency exit zone Z.

When the door body 16 rotates about the removal pivot point P, it is able to bypass the portion of the seat S (e.g., the back rest S1) which might be obstructing the emergency exit zone Z. Stated differently, it may be permissible for a portion of the emergency exit zone Z to be obstructed by the seat back rest S1 because the rotation of the door body 16 about the removal pivot point P will not contact the seat back rest S1 and prevent the door body 16 from being removed. It may therefore be possible for the seats in front of the emergency exit zone Z to have increased pitch or leg room, or to recline further.

All the components of the emergency door 12 having been described, a method of operating the emergency door 12 is now set forth with reference to FIGS. 8 to 11. In the embodiment shown, the steps described below are performed sequentially.

Figure 8:
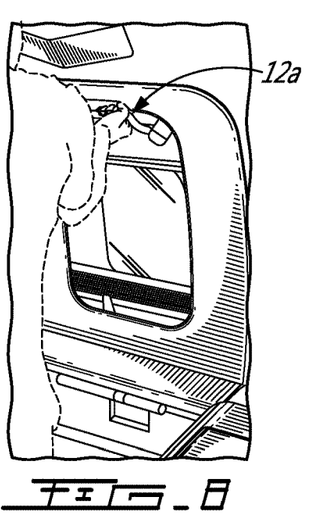
FIGS. 8 to 11 are schematic tridimensional views illustrating steps for opening the emergency door of FIG. 2.
Figure 9:
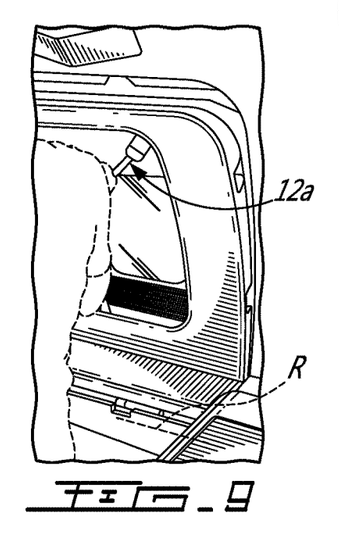
Figure 10:
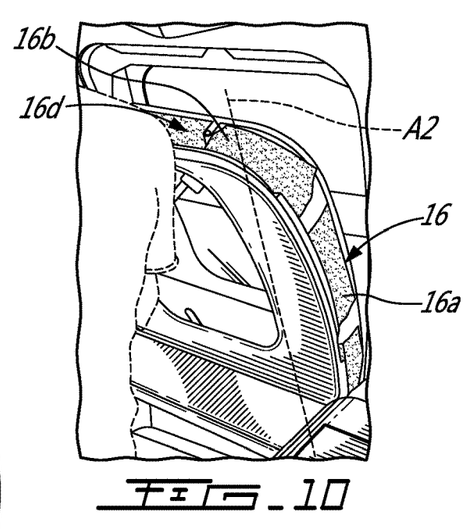
Figure 11:
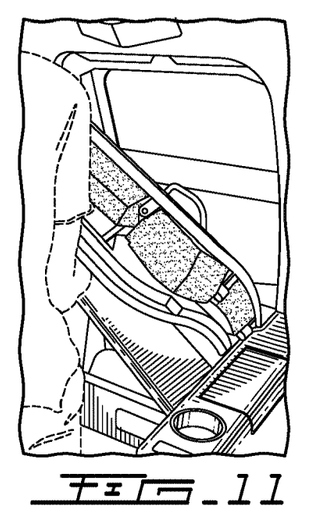
Figure 12:
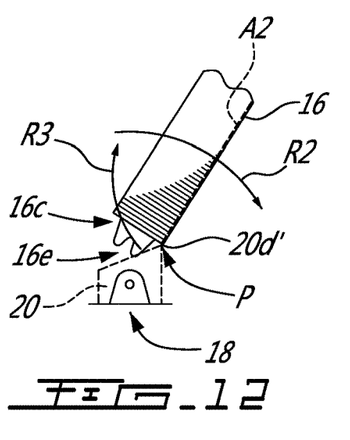
FIG. 12 is a schematic cross-sectional view corresponding to the view of FIG. 6; the door body being shown and illustrating a rotation of the door body relative to a block.

In FIG. 8, the emergency door 12 is in the initial position and locked to the door supporting structure 14. The door body 16 is unlocked from the door supporting structure 14 by actuating the release or handle 12a. As depicted in FIG. 9, the door body 12 is pivoted about the first axis R defined by the door supports 18 inwardly into the cabin C from the initial position shown in FIG. 8, to the intermediate position shown in FIG. 9. As illustrated in FIG. 10, the door body 16 is further pulled inwardly into the aircraft 1 using the release or handle 12a. Doing so disengages the door body 16 from both the door supports 18. As shown in FIG. 11, the door body 16 is fully disengaged from the door supports 18, and is pulled further inwardly into the aircraft 1 while it is rotated about the axis A2. Referring now also to FIG. 12, the user pulls on the release 12a which is aligned with the central axis A of the door body 16, such that the user exerts an inward pulling force along a central mass of the door body 16. When the door body 16 is pulled inwardly in this manner, it disengages from the door supports 18, and the bottom portion 16c of the door body 16 is simultaneously lifted away from the lower wall 14a of the door supporting structure 14. More specifically, the bottom portion 16c of the door body 16 abuts against the block 20. The door body 16 thus forms a lever and a fulcrum is defined by the removal pivot point P, which, in FIG. 12, is located along the top wall 20d of the block 20. Rotation of the door body 16 along direction R2 toward the interior I of the aircraft 1 results in a rotation of the slot 16e of the door body 16 along direction R3. Rotation of the slot 16e results in a movement of the slot 16e away from the door supports 18. Hence, the door body 16 becomes disengaged from the door supports 18.

Additional inward pulling by the user causes the door body 16, because of the abutment of its bottom portion 16c with the top wall 20d of the block 20, to rotate inwardly into the cabin C about the removal pivot point P and the axis A2. In the embodiment shown, the removal pivot point P does not move with respect to the block 20 while the door body 16 is in contact with the block 20. In the depicted embodiment, the bottom portion 16c of the door body 16 is abutted against the top extremity $20d_1$ of the top wall 20d of the block 20.

Stated differently, in the initial position, the door body 16 rests on the door supports 18 and on the block 20, and defines the removal pivot point P. When the user pulls the door body 16 inwardly into the cabin C, the door body 16 pivots along the block 20 to disengage the door body 16 from the door supports 18. The user then continues pulling the door body 16 away from the initial position by rotating the door body 16 simultaneously about the axis A2, which also intersects the removal pivot point P. Once rotated such that it is sufficiently oriented inwardly in the cabin C, the door body 16 may thrown or moved by the user to the side to free a passageway located in front of the opening O.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An emergency door positionable in an exit opening of an aircraft, the exit opening defined by a door supporting structure having a lower wall, two side walls at opposed ends of the lower wall and extending upwardly therefrom, and an upper wall extending between the side walls at an upper end of the side walls, the emergency door comprising:
   door supports mountable to the lower wall to be spaced apart therealong between the side walls, each door support having a base portion mountable to the lower wall and extending upwardly from the base portion into the opening to a pivot point, a first pivot axis being defined between the pivot points of the door supports;
   a block mountable to the lower wall to extend therefrom into the exit opening, the block being offset from a center of the lower wall, the block having an inner wall to face toward an interior of the aircraft and an outer wall to face toward an exterior of the aircraft, a top wall of the block extending between the inner and outer wall, a height of the block defined from the lower wall to the top wall varying between the inner and outer wall, the height of the block being greater at the inner wall than at the outer wall; and
   a door body mountable within the exit opening to the door supporting structure, and pivotally mountable to the door supports, the door body having a release to unlock the door body from the door supporting structure to pivot the door body at least into the aircraft about the first pivot axis from an initial position in which the door body is within the exit opening and away from the initial position until the door body is disengaged from the door supports, a bottom portion of the door body abutting against the block to define a removal pivot point, the door body being pivotable about the removal pivot point to remove the door body from the exit opening.

2. The emergency door of claim 1, wherein the door supports are configured to partition the lower wall into side portions extending between each door support and a nearest one of the side walls, and a central portion extending between the door supports, the block being positionable on the lower wall in one of the side portions of the lower wall.

3. The emergency door of claim 1, wherein a distance from the lower wall to the top wall of the block is greater than a distance from the lower wall to the pivot point of each of the door supports.

4. The emergency door of claim 1, wherein each of the pivot points of the door supports is defined by an engagement of a slot with a pin, the slot being on one of the door body and each door support, and the pin being on the other of the door body and each door support.

5. The emergency door of claim 1, wherein the door body has a peripheral flange, the peripheral flange in the initial position being abuttable against the door supporting structure such that rotation of the door body toward an exterior of the aircraft is blocked.

6. The emergency door of claim 1, wherein the block is in contact with the bottom portion of the door body in the initial position.

7. An aircraft, comprising:
   a fuselage including a door supporting structure defining an exit opening, the door supporting structure having a lower wall, two side walls at opposed ends of the lower wall and extending upwardly therefrom, and an upper wall extending between the side walls at an upper end of the side walls;
   door supports secured to the lower wall and spaced apart therealong between the side wall, each of the door supports having a base portion secured to the lower walls and extending upwardly from the base portion into the exit opening to a pivot point, a first pivot axis being defined between the pivot points of the door supports;
   a block secured to the lower wall to extend therefrom into the exit opening, the block being offset from a center of the lower wall, the block having an inner wall to face toward an interior of the aircraft and an outer wall to face toward an exterior of the aircraft, a top wall of the block extending between the inner and outer wall, a height of the block defined from the lower wall to the top wall and varying between the inner and outer walls, the height of the block being greater at the inner wall than at the outer wall; and
   an emergency door having a door body received within the exit opening to the door supporting structure, and pivotally mounted to the door supports, the door body having a release to unlock the door body from the door supporting structure to pivot the door body at least into the aircraft, the door body being pivotable about the first pivot axis from an initial position in which the door body is within the opening and away from the initial position until the door body is disengaged from the door supports, a bottom portion of the door body abutting against the block to define a removal pivot point, the door body being pivotable about the removal pivot point to remove the door body from the exit opening.

8. The aircraft of claim 7, wherein the door supports are configured to partition the lower wall into side portions extending between each door support and a nearest one of the side walls, and a central portion extending between the door supports, the block being located in one of the side portions.

9. The aircraft of claim 7, wherein a distance from the lower wall to the top wall of the block is greater than a distance from the lower wall to the pivot point.

10. The aircraft of claim 7, wherein each of the pivot points of the door supports is defined by an engagement of a slot with a pin, the slot being on one of the door body and each door support, and the pin being on the other of the door body and each door support.

11. The aircraft of claim 7, further comprising a cabin defined by the fuselage, a floor within the cabin secured to the fuselage, and at least one seat in the cabin being secured to the floor, a portion of the at least one seat disposed in front of the emergency door, the door body being pivotable into the cabin about the removal pivot point to bypass the portion of the at least one seat and remove the door body from the exit opening.

12. The aircraft of claim 7, wherein the door body has a peripheral flange, the peripheral flange in the initial position being abuttable against the door supporting structure such that rotation of the door body toward an exterior of the aircraft is blocked.

13. The aircraft of claim 7, wherein the block is in contact with the bottom portion of the door body in the initial position.

\* \* \* \* \*